US012742746B2

(12) United States Patent
Garcia-Segura et al.

(10) Patent No.: US 12,742,746 B2
(45) Date of Patent: Sep. 22, 2026

(54) FLEXIBLE NANOCOMPOSITE ELECTRODE SENSORS

(71) Applicants: Sergio Garcia-Segura, Tempe, AZ (US); Rishabh Bansal, Tempe, AZ (US); Vanessa Hald, Parker, CO (US)

(72) Inventors: Sergio Garcia-Segura, Tempe, AZ (US); Rishabh Bansal, Tempe, AZ (US); Vanessa Hald, Parker, CO (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 170 days.

(21) Appl. No.: 18/782,972

(22) Filed: Jul. 24, 2024

(65) Prior Publication Data

US 2025/0035578 A1 Jan. 30, 2025

Related U.S. Application Data

(60) Provisional application No. 63/515,245, filed on Jul. 24, 2023.

(51) Int. Cl.
*G01N 27/48* (2006.01)
*G01N 27/30* (2006.01)

(52) U.S. Cl.
CPC ............ *G01N 27/30* (2013.01); *G01N 27/48* (2013.01)

(58) Field of Classification Search
CPC ...................................................... B82Y 20/00
See application file for complete search history.

(56) References Cited

PUBLICATIONS

Adhikari, Arpita, et al. "Selective sensing of dopamine by sodium cholate tailored polypyrrole-silver nanocomposite." Synthetic Metals 260 (2020): 116296.
Balasubramanian, N., et al. "Electrochemical performance of Fe2O3@ PPy nanocomposite as an effective electrode material for supercapacitor." ECS Journal of Solid State Science and Technology 11.9 (2022): 091001.
Arivazhagan, Mani, and Govindhan Maduraiveeran. "Gold-dispersed hierarchical flower-like copper oxide microelectrodes for the sensitive detection of glucose and lactic acid in human serum and urine." Biomaterials science 10.16 (2022): 4538-4548.
Arrieta Almario, Álvaro A., and Roberto L. Vieira. "Study of polypyrrole films modified with copper and silver microparticles by electrochemical cementation process." Journal of the Chilean Chemical Society 51.3 (2006): 971-974.
Balakumar, Vellaichamy, and Periakaruppan Prakash. "A facile in situ synthesis of highly active and reusable ternary Ag-PPy-GO nanocomposite for catalytic oxidation of hydroquinone in aqueous solution." Journal of Catalysis 344 (2016): 795-805.
Balasubramanian, Paramasivam, et al. "Optimized electrochemical synthesis of copper nanoparticles decorated reduced graphene oxide: Application for enzymeless determination of glucose in human blood." Journal of Electroanalytical Chemistry 807 (2017): 128-136.
Bansal, Rishabh, et al. "Development of nano boron-doped diamond electrodes for environmental applications." Journal of Electroanalytical Chemistry 907 (2022): 116028.
Baranwal, Jaya, et al. "Electrochemical sensors and their applications: A review." Chemosensors 10.9 (2022): 363.
Bayat, Maryam, et al. "Study on the electrochromic properties of polypyrrole layers doped with different dye molecules." Journal of Electroanalytical Chemistry 886 (2021): 115113.
Borras, Nuria, et al. "Flexible electroactive membranes for the electrochemical detection of dopamine." European Polymer Journal 187 (2023): 111915.
Cai, Guangming, et al. "Highly stretchable sheath-core yarns for multifunctional wearable electronics." ACS Applied Materials & Interfaces 12.26 (2020): 29717-29727.
Cerrón-Calle, Gabriel Antonio, et al. "Highly reactive Cu-Pt bimetallic 3D-electrocatalyst for selective nitrate reduction to ammonia." Applied Catalysis B: Environmental 302 (2022): 120844.
Chen, Jingsi, et al. "Polypyrrole-doped conductive supramolecular elastomer with stretchability, rapid self-healing, and adhesive property for flexible electronic sensors." ACS applied materials & interfaces 11.20 (2019): 18720-18729.
Choo, Sung-Sik, et al. "Electrochemical detection of dopamine using 3D porous graphene oxide/gold nanoparticle composites." Sensors 17.4 (2017): 861.
Vasconcellos, Maria de Lourdes S., et al. "Dimensionally stable anode based sensor for urea determination via linear sweep voltammetry." Sensors 21.10 (2021): 3450.
De Oliveira, Monialine Sousa, et al. "Composite films based on copper nanoparticles and nickel phthalocyanine as electrochemical sensors for serotonin detection." Surfaces and Interfaces 25 (2021): 101245.
Do Vale-Júnior, Edilson, et al. "Electrochemical technologies for detecting and degrading benzoquinone using diamond films." ChemElectroChem 6.17 (2019): 4383-4390.
Dutta, Sujan, et al. "The effect of electroactive length and intrinsic conductivity on the actuation behaviour of conducting polymer-based yarn actuators for textile muscles." Sensors and Actuators B: Chemical 370 (2022): 132384.
Gao, Fengxian, et al. "All-polymer free-standing electrodes for flexible electrochemical sensors." Sensors and Actuators B: Chemical 334 (2021): 129675.

(Continued)

*Primary Examiner* — Gurpreet Kaur
(74) *Attorney, Agent, or Firm* — Fish & Richardson P.C.

(57) ABSTRACT

A composite electrode includes a polypyrrole matrix, and metal nanoparticles coupled to the polypyrrole matrix. Assessing the presence of an analyte includes placing the composite electrode in a solution to be tested for the analyte, applying an electrical current to the electrode, and assessing the presence of an oxidation peak at a predetermined voltage with respect to a reference electrode. The presence of the oxidation peak at the predetermined voltage indicates the presence of the analyte. Fabricating the composite electrode includes electropolymerizing a polypyrrole matrix onto a metal substrate, separating the polypyrrole matrix from the metal substrate, and electrodepositing the metal nanoparticles onto the polypyrrole matrix to yield the electrode.

7 Claims, 9 Drawing Sheets

(56) References Cited

PUBLICATIONS

Ghadimi, Hanieh, M. R. Mahmoudian, and Wan Jefrey Basirun. "A sensitive dopamine biosensor based on ultra-thin polypyrrole nanosheets decorated with Pt nanoparticles." RSC Advances 5.49 (2015): 39366-39374.
Ghanbari, Kh, and N. Hajheidari. "ZnO-CuxO/polypyrrole nanocomposite modified electrode for simultaneous determination of ascorbic acid, dopamine, and uric acid." Analytical biochemistry 473 (2015): 53-62.
Ghanbari, Khadijeh, and Nahid Hajheidari. "Simultaneous electrochemical determination of dopamine, uric acid and ascorbic acid using silver nanoparticles deposited on polypyrrole nanofibers." Journal of Polymer Research 22 (2015): 1-9.
Ghodselahi, T., et al. "XPS study of the Cu@ Cu2O core-shell nanoparticles." Applied Surface Science 255.5 (2008): 2730-2734.
Ghosh, Srabanti, et al. "Enhanced solar hydrogen generation using Cu—Cu20 integrated polypyrrole nanofibers as heterostructured catalysts." International Journal of Hydrogen Energy 45.11 (2020): 6159-6173.
Gmucová, Katarína. "Fundamental aspects of organic conductive polymers as electrodes." Current Opinion in Electrochemistry 36 (2022): 101117.
Guo, Chun Xian, et al. "RGD-peptide functionalized graphene biomimetic live-cell sensor for real-time detection of nitric oxide molecules." Acs Nano 6.8 (2012): 6944-6951.
Huang, Yang, et al. "Nanostructured polypyrrole as a flexible electrode material of supercapacitor." Nano Energy 22 (2016): 422-438.
Jeerapan, Itthipon, and Sujittra Poorahong. "Flexible and stretchable electrochemical sensing systems: materials, energy sources, and integrations." Journal of The Electrochemical Society 167.3 (2020): 037573.
John, Anjali, et al. "Electrochemical sensors using conducting polymer/noble metal nanoparticle nanocomposites for the detection of various analytes: a review." Journal of Nanostructure in Chemistry 11 (2021): 1-31.
Kahlouche, Karima, et al. "Controlled modification of electrochemical microsystems with polyethylenimine/reduced graphene oxide using electrophoretic deposition: Sensing of dopamine levels in meat samples." Talanta 178 (2018): 432-440.
Kim, Da-Seul, et al. "Electrochemical detection of dopamine using periodic cylindrical gold nanoelectrode arrays." Scientific reports 8.1 (2018): 14049.
Li, Rongfeng, et al. "A flexible and physically transient electrochemical sensor for real-time wireless nitric oxide monitoring." Nature communications 11.1 (2020): 3207.
Li, Rui, et al. "Electrochemical dual signal sensing platform for the simultaneous determination of dopamine, uric acid and glucose based on copper and cerium bimetallic carbon nanocomposites." Bioelectrochemistry 139 (2021): 107745.
Li, Cuihuan, et al. "Highly aligned cellulose/polypyrrole composite nanofibers via electrospinning and in situ polymerization for anisotropic flexible strain sensor." ACS applied materials & interfaces 15.7 (2023): 9820-9829.
Liu, Yan-Ling, et al. "Stretchable electrochemical sensor for real-time monitoring of cells and tissues." Angewandte Chemie International Edition 55.14 (2016): 4537-4541.
Liu, Yao, et al. "Recent progress regarding electrochemical sensors for the detection of typical pollutants in water environments." Analytical Sciences 38.1 (2022): 55-70.
Lü, Haitao, et al. "A sensitive electrochemical sensor based on metal cobalt wrapped conducting polymer polypyrrole nanocone arrays for the assay of nitrite." Microchimica Acta 189 (2022): 1-9.
Mao, Hui, et al. "Preparation of poly (ionic liquids)-functionalized polypyrrole nanotubes and their electrocatalytic application to simultaneously determine dopamine and ascorbic acid." Journal of Materials Chemistry B 3.26 (2015): 5310-5317.
Meyyappan, M. "Nano biosensors for neurochemical monitoring." Nano Convergence 2 (2015): 1-6.
Monzó, Javier, et al. "Fundamentals, achievements and challenges in the electrochemical sensing of pathogens." Analyst 140.21 (2015): 7116-7128.
Otero, Toribio F., et al. "Electrodeposition of Cu on deeply reduced polypyrrole electrodes at very high cathodic potentials." Journal of Materials Chemistry 15.16 (2005): 1662-1667.
Patois, Tilia, et al. "Characterization of the surface properties of polypyrrole films: Influence of electrodeposition parameters." Synthetic Metals 161.21-22 (2011): 2498-2505.
Qing, Xing, et al. "Wearable fiber-based organic electrochemical transistors as a platform for highly sensitive dopamine monitoring." ACS applied materials & interfaces 11.14 (2019): 13105-13113.
Ramanavičius, A., A. Ramanaviienė, and A. Malinauskas. "Electrochemical sensors based on conducting polymer- polypyrrole." Electrochimica acta 51.27 (2006): 6025-6037.
Ravichandran, Ranjithkumar, et al. "Type I collagen-derived injectable conductive hydrogel scaffolds as glucose sensors." ACS Applied Materials & Interfaces 10.19 (2018): 16244-16249.
Shen, Yuqing, et al. "Ultrafine copper decorated polypyrrole nanotube electrode for nitrite detection." Ionics 25 (2019): 297-307.
Tran, Luyen Thi, et al. "Electrosynthesis of electrochemically reduced graphene oxide/polyaniline nanowire/silver nanoflower nanocomposite for development of a highly sensitive electrochemical DNA sensor." RSC advances 11.32 (2021): 19470-19481.
Wang, Yangyuchuan, et al. "Polypyrrole-derived carbon nanotubes for potential application in electrochemical detection of dopamine." Solid State Sciences 134 (2022): 107038.
Wei, Luo, et al. "Ultrasensitive non-enzymatic glucose sensors based on hybrid reduced graphene oxide and carbonized silk fabric electrodes decorated with Cu nanoflowers." Journal of The Electrochemical Society 167.12 (2020): 127501.
Xing, Liwen, Qinfeng Rong, and Zhanfang Ma. "Non-enzymatic electrochemical sensing of hydrogen peroxide based on polypyrrole/platinum nanocomposites." Sensors and Actuators B: Chemical 221 (2015): 242-247.
Yang, Yang, Meixian Li, and Zhiwei Zhu. "A novel electrochemical sensor based on carbon nanotubes array for selective detection of dopamine or uric acid." Talanta 201 (2019): 295-300.
Yu, You, et al. "Flexible electrochemical bioelectronics: the rise of in situ bioanalysis." Advanced materials 32.15 (2020): 1902083.
Yuan, Y. J., S. B. Adeloju, and G. G. Wallace. "In-situ electrochemical studies on the redox properties of polypyrrole in aqueous solutions." European polymer journal 35.10 (1999): 1761-1772.
Zhang, Song, et al. "Real-time simultaneous recording of electrophysiological activities and dopamine overflow in the deep brain nuclei of a non-human primate with Parkinson's disease using nano-based microelectrode arrays." Microsystems & Nanoengineering 4.1 (2018): 1-9.
Zhou, Kunfeng, et al. "Molybdenum oxide-based metal-organic framework/polypyrrole nanocomposites for enhancing electrochemical detection of dopamine." Talanta 209 (2020): 120507.

FLEXIBLE NANOCOMPOSITE ELECTRODE SENSORS

CROSS-REFERENCE TO RELATED APPLICATION

This application claims the benefit of U.S. Patent Application No. 63/515,245 filed on Jul. 24, 2023, which is incorporated herein by reference in its entirety.

STATEMENT OF GOVERNMENT SUPPORT

This invention was made with government support under 1449500 awarded by the National Science Foundation. The government has certain rights in the invention.

TECHNICAL FIELD

This invention relates to flexible nanocomposite electrochemical sensors, including flexible electrodes based on the combination of a semiconductor polymer nano-enabled with metallic catalytic centers.

BACKGROUND

Electrochemical sensors are employed for sensing and monitoring analytes in fields including biomedical, environmental, and industrial applications. Electrochemical sensors operate by detecting electrical changes caused by the interaction of analytes with the sensor surface. The sensors convert chemical information into an electrical signal. Electrochemical sensors are used to detect and quantify target substances.

SUMMARY

The present disclosure describes conductive self-standing polypyrrole electrode sensors modified by electrodeposition to contain metal domains (e.g., nanodomains) adhered to the polypyrrole substrate, which increases sensing response, and to methods of fabrication of the sensors. The generated composites disclosed herein maintain the flexible nature of polymers (e.g., polypyrrole) while using the electrocatalytic properties of metals for target analyte detection (e.g., chemical, organic, and biological analytes). An embodiment of the present disclosure is a sensor for detecting an analyte, the sensor including a hybrid nanocomposite of self-supported polypyrrole electrodes modified with metal nanoparticles (e.g., Cu, Au, Pt). Another embodiment of the present disclosure is a sensor for detecting an analyte, the sensor including a hybrid nanocomposite of self-supported polypyrrole electrodes modified with copper nanoparticles (PPy-Cu). Another embodiment of the present disclosure is a flexible sensor including a hybrid nanocomposite of self-supported polypyrrole electrodes modified with copper nanoparticles (PPy-Cu) for the electrochemical detection of dopamine.

In a first general aspect, a composite electrode includes a polypyrrole matrix and metal nanoparticles coupled to the polypyrrole matrix.

Implementations of the first general aspect may include one or more of the following features.

In some cases, the polypyrrole matrix is free of a metallic substrate. In certain cases, the composite electrode is flexible. A thickness of the composite electrode is typically in a range of 50 μm to 150 μm. In some implementations, the metal nanoparticles are incorporated in the polypyrrole matrix. The metal nanoparticles can be deposited on a surface of the polypyrrole matrix. The metal nanoparticles typically include copper, gold, platinum, or any combination thereof. In some examples, at least some of the metal nanoparticles are clustered together. The metal nanoparticles can be in the form of dendritic structures.

In a second general aspect, assessing the presence of an analyte includes placing the composite electrode of the first general aspect in a solution to be tested for the analyte, applying an electrical current to the electrode, and assessing the presence of an oxidation peak at a predetermined voltage with respect to a reference electrode. The presence of the oxidation peak at the predetermined voltage typically indicates the presence of the analyte.

Implementations of the second general aspect may include one or more of the following features.

In some implementations, the analyte includes dopamine. In some examples, applying the current includes differential pulse voltammetry.

In a third general aspect, fabricating an electrode includes electropolymerizing a polypyrrole matrix onto a metal substrate, separating the polypyrrole matrix from the metal substrate, and electrodepositing the metal nanoparticles onto the polypyrrole matrix to yield the electrode.

Implementations of the third general aspect may include one or more of the following features.

In some implementations, electropolymerizing the polypyrrole matrix includes contacting the metal substrate with an electrolyte bath comprising pyrrole monomers, providing an electrical current to the metal substrate, and polymerizing the pyrrole monomers on the metal substrate. In some examples, the electrolyte bath further includes a surfactant, an electrolyte, and an organic solvent. In certain implementations, the electrolyte bath further includes a surfactant, an electrolyte, and an organic solvent. In some cases, fabricating an electrode further includes rinsing and drying the polypyrrole matrix before separating the polypyrrole matrix from the metal substrate. Electrodepositing the metal nanoparticles onto the polypyrrole matrix typically includes contacting the polypyrrole matrix with an electrodeposition bath including metal ions in an acidic solution. In some cases, electrodepositing occurs at a constant cathodic potential. The electrodepositing typically occurs for a length of time between 60 seconds and 300 seconds.

The self-standing sensor disclosed herein can be composed entirely of polypyrrole, a biocompatible polymer, and copper nanoparticles, making it sustainable and environmentally friendly. The present disclosure provides for the development of flexible sensors for the detection of neurotransmitters and environmentally relevant analytes. The mechanically flexible electrodes provide opportunities for sensing devices that can be implemented in challenging geometries, including in vivo applications.

Self-standing electrodes with intrinsic conductivity and high electrocatalytic activity provide flexibility and wearability. The present disclosure demonstrates the fabrication of flexible sensors based on a hybrid nanocomposite of self-supported polypyrrole electrodes modified with copper nanoparticles (PPy-Cu) for the electrochemical detection of dopamine. The incorporation of copper nanoparticles in the self-standing polypyrrole matrix introduces additional electroactive sites. An increased number of electroactive sites can increase charge transfer and improve the device's sensitivity.

Flexible electrochemical sensors described herein are adaptable to different geometries. Adaptability to different geometries may facilitate the use of flexible electrochemical sensors in a range of applications, including wearable and implantable sensors.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 2A depicts XPS spectra of PPy. FIG. 2B depicts XPS spectra of PPy-Cu. FIG. 2C depicts XPS spectra of PPy-Cu with an electrodeposition time of 60 s. FIG. 2D depicts XPS spectra of PPy-Cu with an electrodeposition time of 120 s. FIG. 2E depicts XPS spectra of PPy-Cu with an electrodeposition time of 180 s. FIG. 2F depicts XPS spectra of PPy-Cu with an electrodeposition time of 300 seconds(s).

DETAILED DESCRIPTION

The present disclosure describes conductive self-standing polypyrrole electrode sensors modified by electrodeposition to contain metal domains adhered to the polypyrrole substrate and to methods of fabrication thereof. In some cases, domains can be nanodomains.

Conducting polymers are electrically conductive and typically mechanically stable. Among the various conducting polymers, polypyrrole has high electronic conductivity and increased environmental stability. Incorporating metal nanoparticles within a polymer matrix can create electrostatic interactions and can improve electron transport from/towards an electrolyte. demonstrating increased sensing performance of a polymer-metal nanocomposite. Copper nanoparticles can increase sensor surface area and improve stability and durability. Copper has good conductivity and high abundance.

Electrochemical sensors are typically supported on a rigid substrate such as a glassy carbon electrode. The present disclosure describes the fabrication of self-standing polypyrrole-metal nanoparticle-based sensors. In some implementations, self-standing polypyrrole-metal nanoparticle-based sensors can be used for the detection of dopamine as a model target analyte. The analyte detecting sensor can include a hybrid nanocomposite of self-supported polypyrrole electrodes modified with metal nanoparticles (e.g., Cu, Au, Pt). The analyte detecting sensor can include a hybrid nanocomposite of self-supported polypyrrole electrodes modified with copper nanoparticles (PPy-Cu). The analyte detecting sensor can be a flexible sensor including a hybrid nanocomposite of self-supported polypyrrole electrodes modified with copper nanoparticles (PPy-Cu) for the electrochemical detection of dopamine.

EXAMPLES

Figure 1:
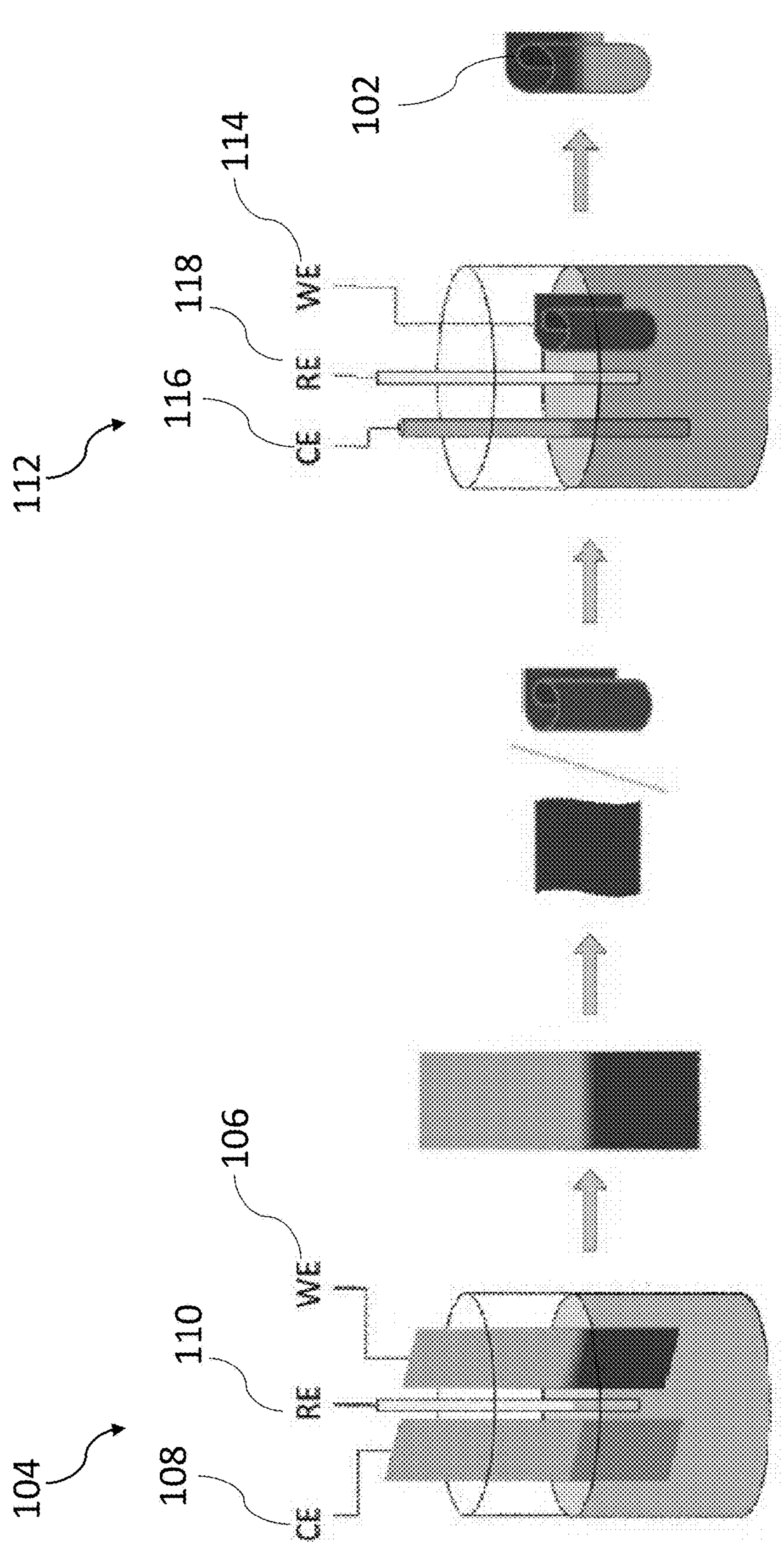
FIG. 1 depicts polypyrrole electrodes modified with copper nanoparticles (PPy-Cu) flexible nanocomposites.

Self-standing polypyrrole electrode preparation. FIG. 1 shows the preparation of a self-standing polypyrrole electrode. Self-standing polypyrrole flexible electrodes 102 are synthesized using the electropolymerization of pyrrole in an organic phase system. A three-electrode system 104 is arranged in configuration shown in FIG. 1. FIG. 1 shows a three-electrode configuration with a central metal plate as the deposition plate 106, a counter electrode 108, and an Ag/AgCl reference electrode 110. In one example, the electrolyte bath includes 0.2 M pyrrole monomer, 2.5 mM sodium dodecylbenzenesulfonate (DBSNa) as surfactant, and 0.1 M sodium perchlorate as supporting electrolyte in a 2:98 water:acetonitrile solution. The pyrrole monomer can be used as received or distilled prior to use.

The surfactant can be anionic, cationic, or non-ionic. The surfactant is selected from sodium dodecyl sulfate (SDS) and DBSNa, poly(ethylene oxide) nonyl phenyl ether, poly (ethylene oxide) octadecyl ether, alkylnaphthalenesulfonate and sodium n-alkyl sulfate, sodium docusate, poly(ethylene glycol), TWEEN (e.g., 20, 40, 60, 80), polyvinylpyrrolidone, Triton X-100, cetyl trimethylammonium chloride, and benzylalkoammonium chloride. In one example, the surfactant is DBSNa.

The supporting electrolyte typically includes salts of alkali metals (e.g., Li, Na, K, and Cs) and quaternary ammonium ions (e.g., $NR_4$, where each R is independently $C_1$-$C_{20}$ alkyl or benzyl). Suitable anions include $ClO_4^-$, $BF_4^-$, $PF_6^-$, $SO_4^-$, and $OTs^-$. In one example, the supporting electrolyte is sodium perchlorate.

The solvent solution typically includes water and an organic solvent. In one example, the organic solvent is acetonitrile. The organic solvent can be a polar aprotic solvent (e.g., dimethylformamide, dimethylacetamide, tetrahydrofuran, dimethyl sulfoxide, or a combination thereof). A volume ratio of the water to the organic solvent typically ranges from about 1:99 to about 99:1 (e.g., about 2:98 to about 98:2, about 5:95 to about 95:5, about 10:90 to about 90:10, about 20:80 to about 80:20, about 30:70 to about 70:30, or about 40:60 to about 60:40).

Fabrication of the electrode includes polymerization of pyrrole on a metal substrate for a length of time at a selected current density to obtain a thickness. Suitable metals include titanium, platinum, stainless steel, mild steel, and copper plate. The pyrrole is polymerized on the metal plate for about 30 minutes to about 8 hours (e.g., about 1-5 hours, about 2-4 hours, or about 3 hours) at a constant current density to obtain a thickness. A suitable range for the constant current density is about 0.1 $mA/cm^2$ to about 10 $mA/cm^2$ (e.g., about 0.5 $mA/cm^2$ to about 8 $mA/cm^2$, about 1 $mA/cm^2$ to about 5 $mA/cm^2$, about 2 $mA/cm^2$ to about 4 $mA/cm^2$, or about 2 $mA/cm^2$ to about 3 $mA/cm^2$).

The pyrrole is polymerized to obtain a thickness of about 50 μm to about 100 μm. At a thickness of about 50 μm to about 100 μm, polypyrrole can function as a self-standing electrode. In one example, pyrrole is polymerized to obtain a thickness of about 70 μm. The polypyrrole electrode is rinsed with an organic solvent (e.g., acetonitrile), to remove excess monomer, rinsed with milli-Q water, and dried in an ambient atmosphere (e.g., for 1 h). The polypyrrole electrode is cut from the metal substrate to yield a self-standing polypyrrole electrode.

Synthesis of flexible PPy-metal nanocomposites. The fabrication of hybrid polypyrrole-metal flexible nanocomposites is carried out through metal electrodeposition under potentiostatic conditions using a potentiostat. FIG. 1 depicts a three-electrode system 112 for the fabrication of hybrid polypyrrole-metal flexible nanocomposites using metal electrodeposition. The as-prepared self-standing polypyrrole electrodes is the deposition electrode 114, a platinum wire is the auxiliary electrode 116, and Ag/AgCl is the reference electrode 118. The electrodeposition bath is a solution of soluble salt of the metal to be electrodeposited (e.g., copper sulfate, potassium dicyanoaurate, gold chloride, silver cyanide, silver nitrate, Pt(II) phosphate-based salts or Pt(IV) hexahydroxyplatinate or tetrachloride salts, $H_2(PtCl_8)$, $(NH_4)_2PtCl_6$, $Pt(NH_3)_2(NO_2)_2$, $H_2Pt(NO_2)_2SO_4$, $Na_2(Pt(OH)_6)\cdot 2H_2O$, $H_2(Pt(OH)_6)$, $K_2(Pt(OH)_6)$, and $PtCl_4\cdot H_2O$).

A concentration of the soluble salt in the electrodeposition bath is typically in a range of 0.001 M to about 1 M, about 0.005 M to about 0.8 M, about 0.01 M to about 0.5 M, about 0.02 M to about 0.4 M, about 0.0 M to about 0.4 M, about 0.04 M to about 0.3 M, about 0.05 M to about 0.2 M, about 0.08 M to about 0.1 M, or about 0.09 M to about 0.1 M).

The electrodeposition bath can include an acid (e.g., sulfuric acid, nitric acid, hydrochloric acid, phosphoric acid, and combinations thereof). In one example, the electrodeposition bath includes aqua regia (1:3 nitric acid:hydrochloric acid). A concentration of the acid is typically in a range of about 0.01 M to about 10 M.

Electrodeposition onto the self-standing polypyrrole electrodes is typically conducted at a constant cathodic potential of −0.3 V vs. Ag/AgCl (3 mol $L^{-1}$ KCl) sustained for different times ranging from about 1 minute to about 10 minutes (e.g., about 1 minute to about 5 minutes). Typically, electrodeposition onto the self-standing polypyrrole electrodes is conducted at a constant cathodic potential that does not exceed a negative potential of more than about-0.4 V.

Figures 2A, 2B:
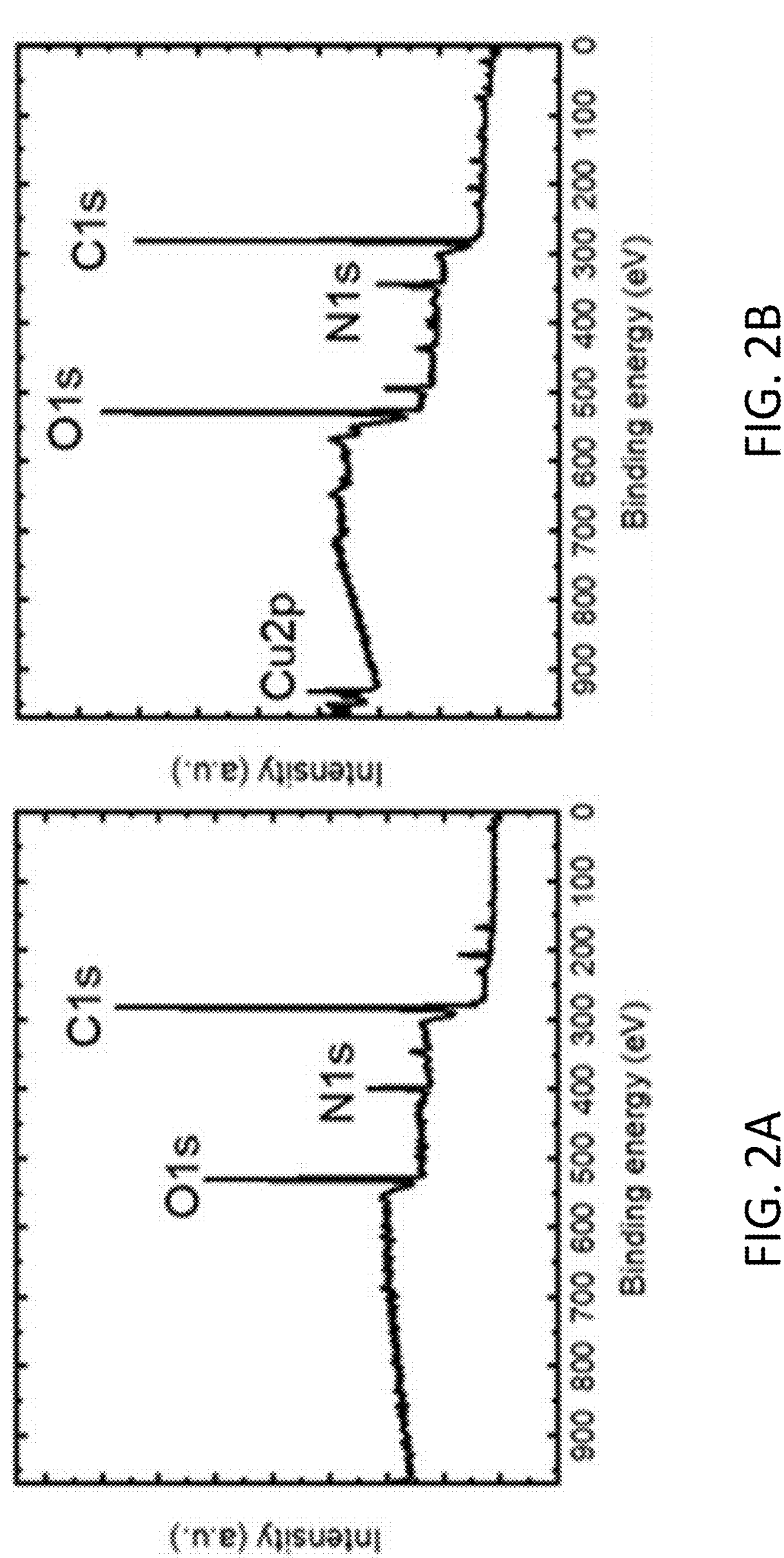
FIGS. 2A-2F depict X-ray photoelectron spectroscopy (XPS) spectra of polypyrrole (PPy) and PPy-Cu.
Figures 2C, 2D:
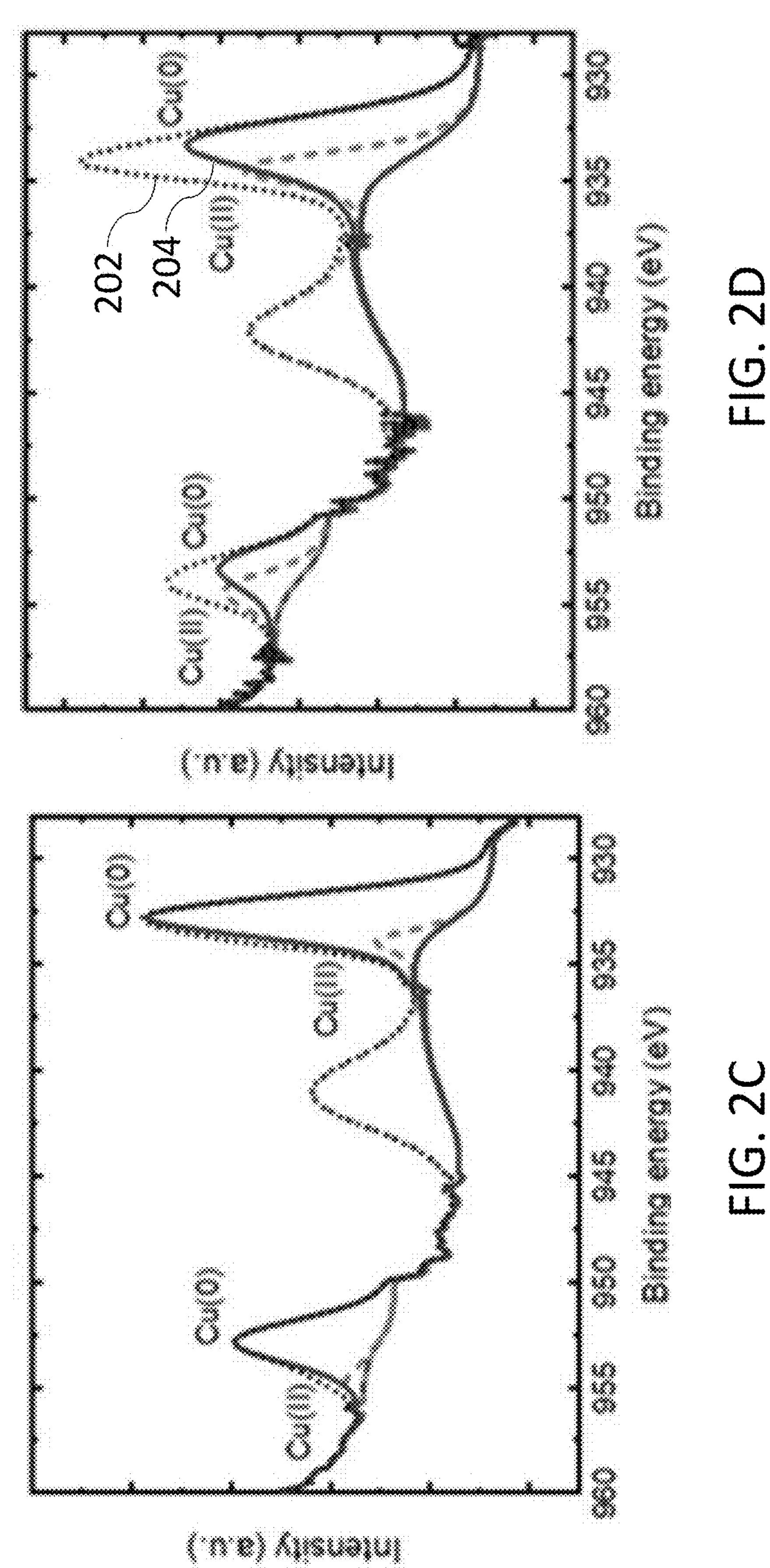
Figures 2E, 2F:
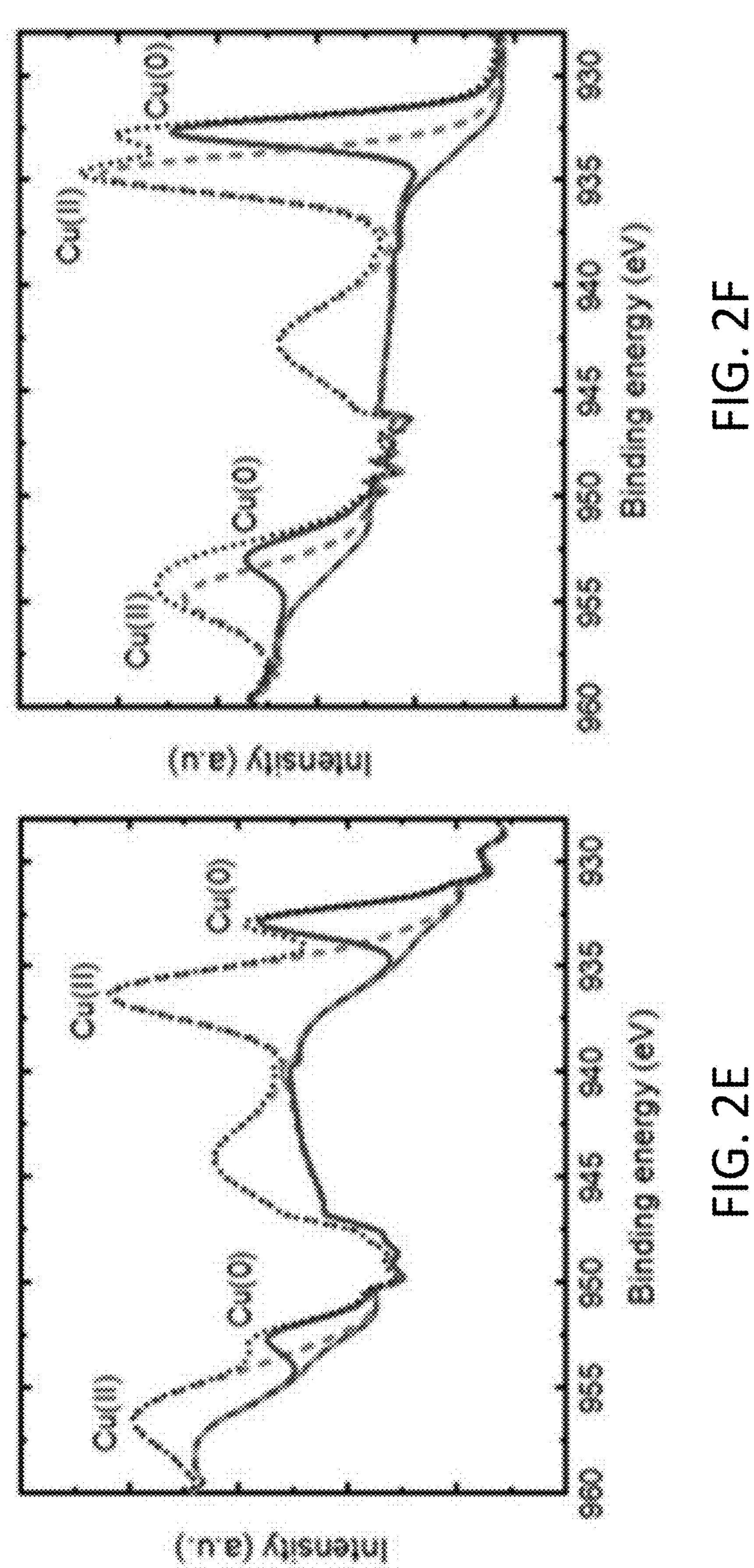
Figure 3:
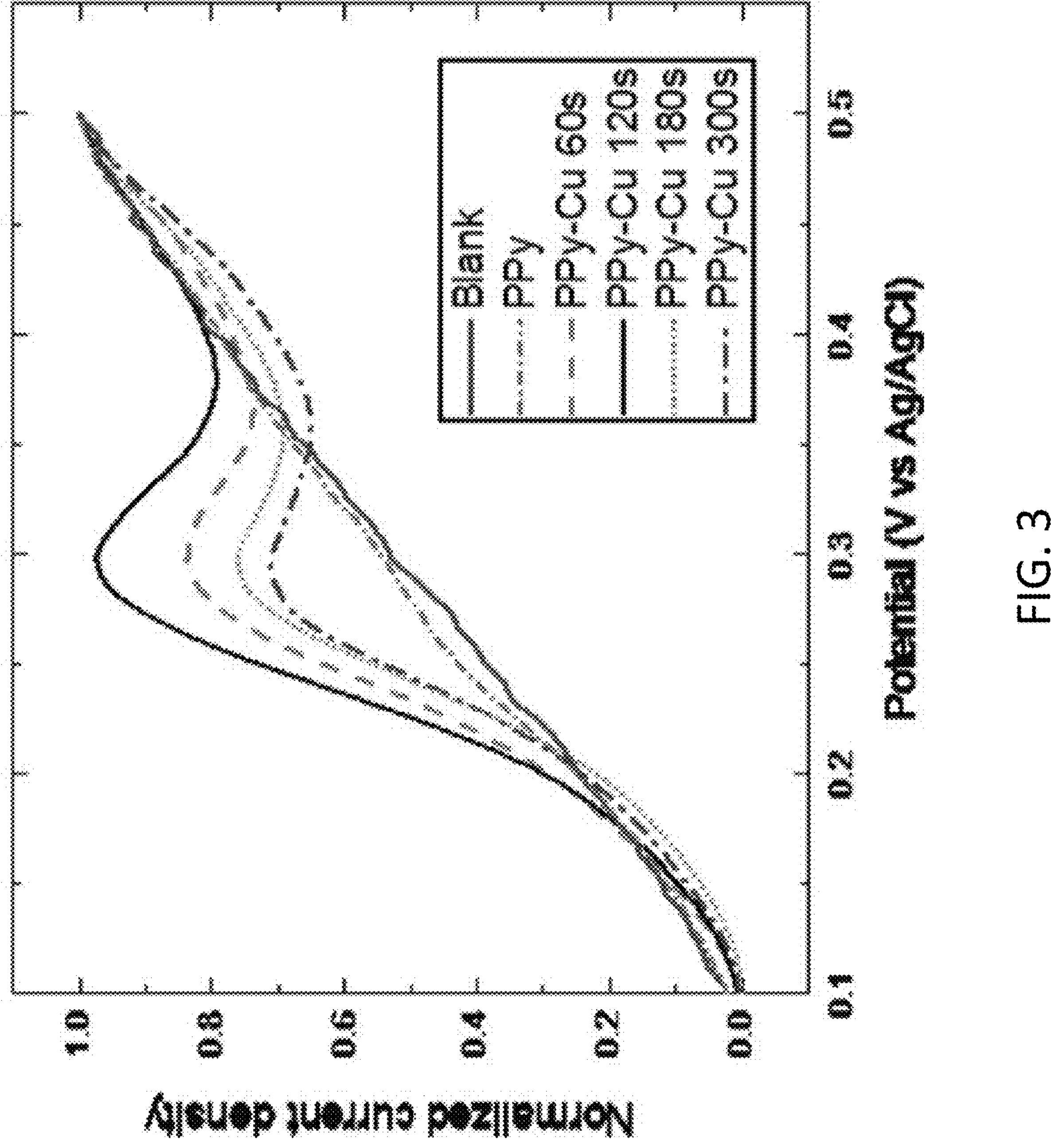
FIG. 3 shows a differential pulse voltammetry (DPV) response of flexible PPy and PPy-Cu electrodes for 50 μM dopamine in 0.1M PBS at a pH=6.
Figure 4:
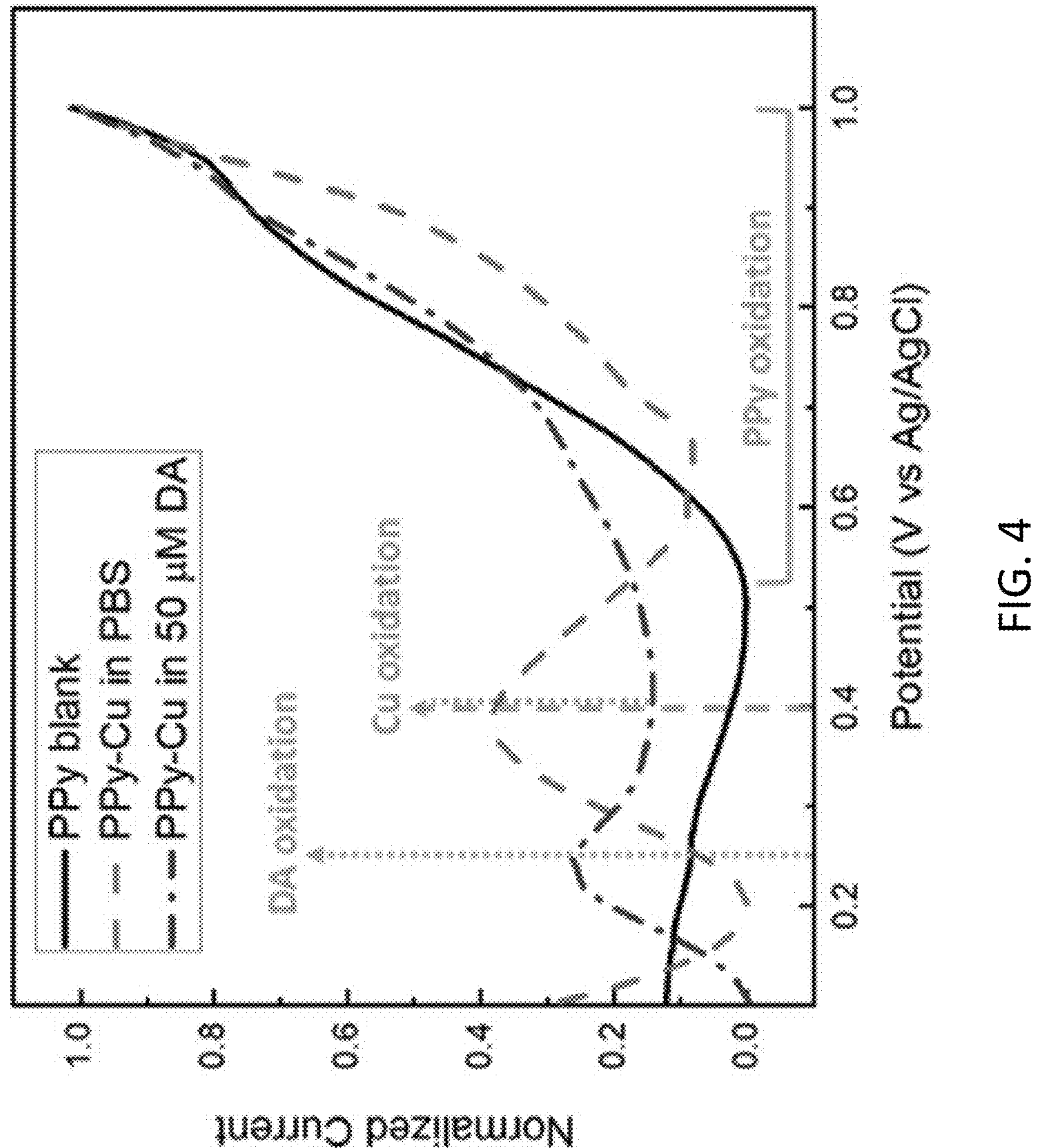
FIG. 4 shows a comparison of normalized current of DPV responses of different electrodes in the presence of 50 μM dopamine in PBS.

FIGS. 2A-2F show X-ray photoelectron spectroscopy (XPS) spectra of the self-standing polypyrrole (PPy) and polypyrrole-copper (PPy-Cu) nanocomposite electrodes. FIG. 3 shows a differential pulse voltammetry (DPV) response of flexible PPy and PPy-Cu electrodes for 50 μM dopamine in 0.1 M PBS (pH=6), with a scan rate of 4 mV/s, and an amplitude of 50 mV. FIG. 4 shows a comparison of DPV responses of different electrodes under scan rate 4 mV/s and an amplitude of 50 mV. The solid line (-) shows PPy in PBS. The dashed line (---) shows PPy-Cu with an electrodeposition time of 120 s in PBS. The dotted line (•••) shows PPy-Cu with an electrodeposition time of 120 s in the presence of 50 μM dopamine in PBS. FIG. 3 and FIG. 4 are plots of normalized current versus potential and show that the self-standing polypyrrole (PPy) and polypyrrole-copper (PPy-Cu) nanocomposite electrodes have similar DPV responses.

Polypyrrole flexible electrodes as dopamine sensors. DPV can be used to identify the characteristic peak of the oxidation of dopamine, which occurs at about +0.3 V vs. Ag/AgCl (reaction schematic (1)) on the as-prepared polypyrrole (PPy) and polypyrrole-copper (PPy-Cu) nanocomposites.

(1)

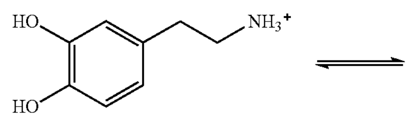

-continued

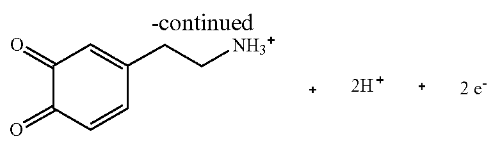

The normalized current response registered during DPV analyses for electrodes prepared in Example 1 in the presence and absence of 50 μM dopamine in 0.1 M PBS (pH=6) is shown in FIG. 3. Polypyrrole (PPy) electrodes do not depict an increase in current response in the presence of dopamine which may be due at least in part to polypyrrole not being sensitive to the analyte. The nanocomposites that incorporate copper domains show a peak of dopamine oxidation at 0.3 V vs. Ag/AgCl.

The polypyrrole-copper (PPy-Cu) electrodes prepared as described herein are oxidatively stable within the voltage range required to detect dopamine. As shown in FIG. 4, the characteristic oxidation peak of polypyrrole (PPy) is observed at 0.8 V vs. Ag/AgCl with an onset potential of approximately about 0.6 V vs. Ag/AgCl for all the electrodes. The oxidation of copper domains shows an oxidation peak at 0.4 V vs. Ag/AgCl. The peak of dopamine (DA) oxidation is observed at 0.27 V vs. Ag/AgCl which represents a difference of >100 mV with respect to the other two oxidation peaks (e.g., Cu and PPy).

Figures 5A, 5B:
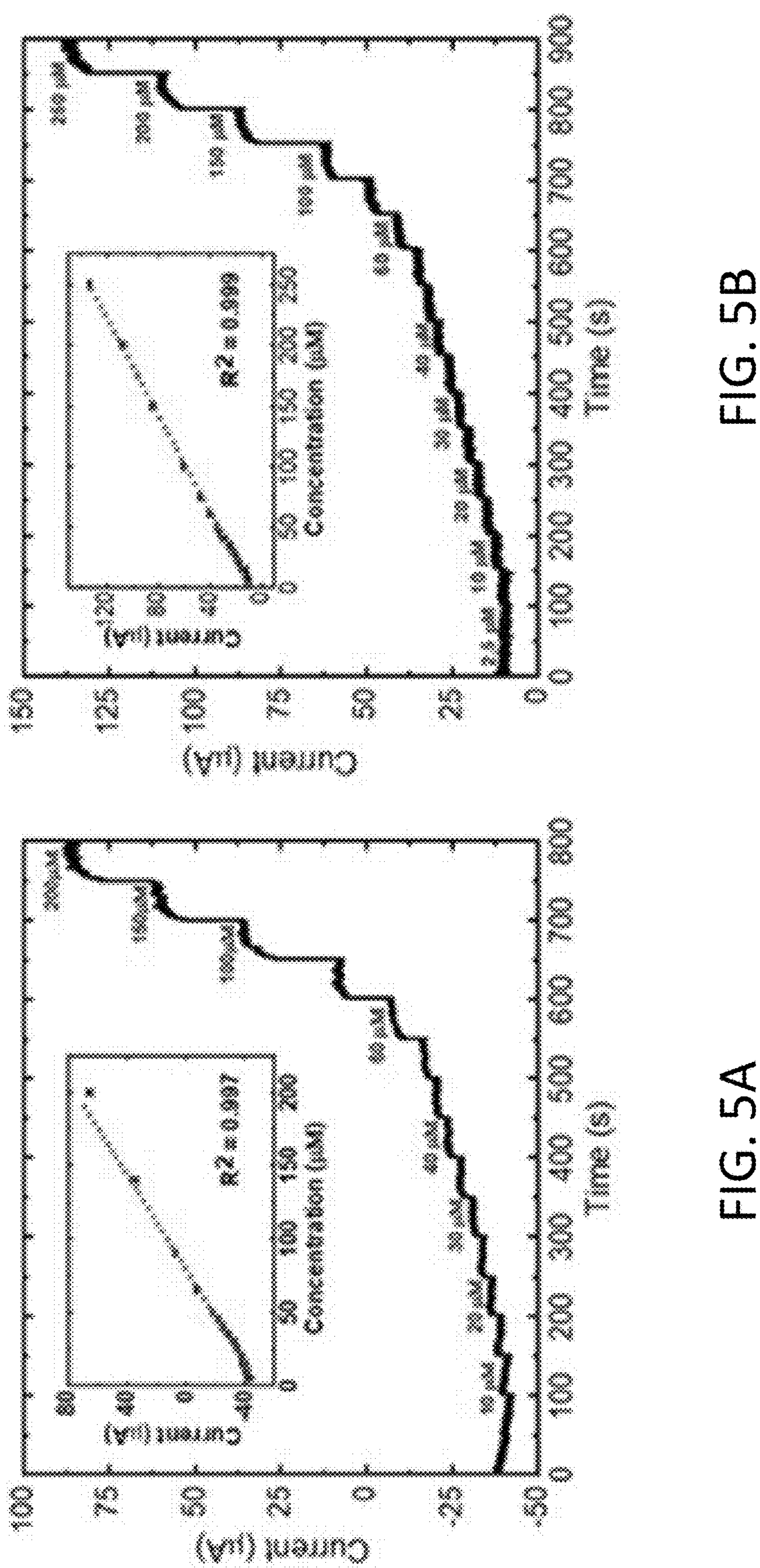
FIGS. 5A-5D depict chronoamperometric responses of PPy and PPy-Cu for the successive addition of dopamine in 0.1 M PBS (pH=6) with an electrodeposition time of 60 s, 120 s, 180 s, 300 s, respectively. Inset images show the calibration curve for peak intensity vs. dopamine concentration.
Figures 5C, 5D:
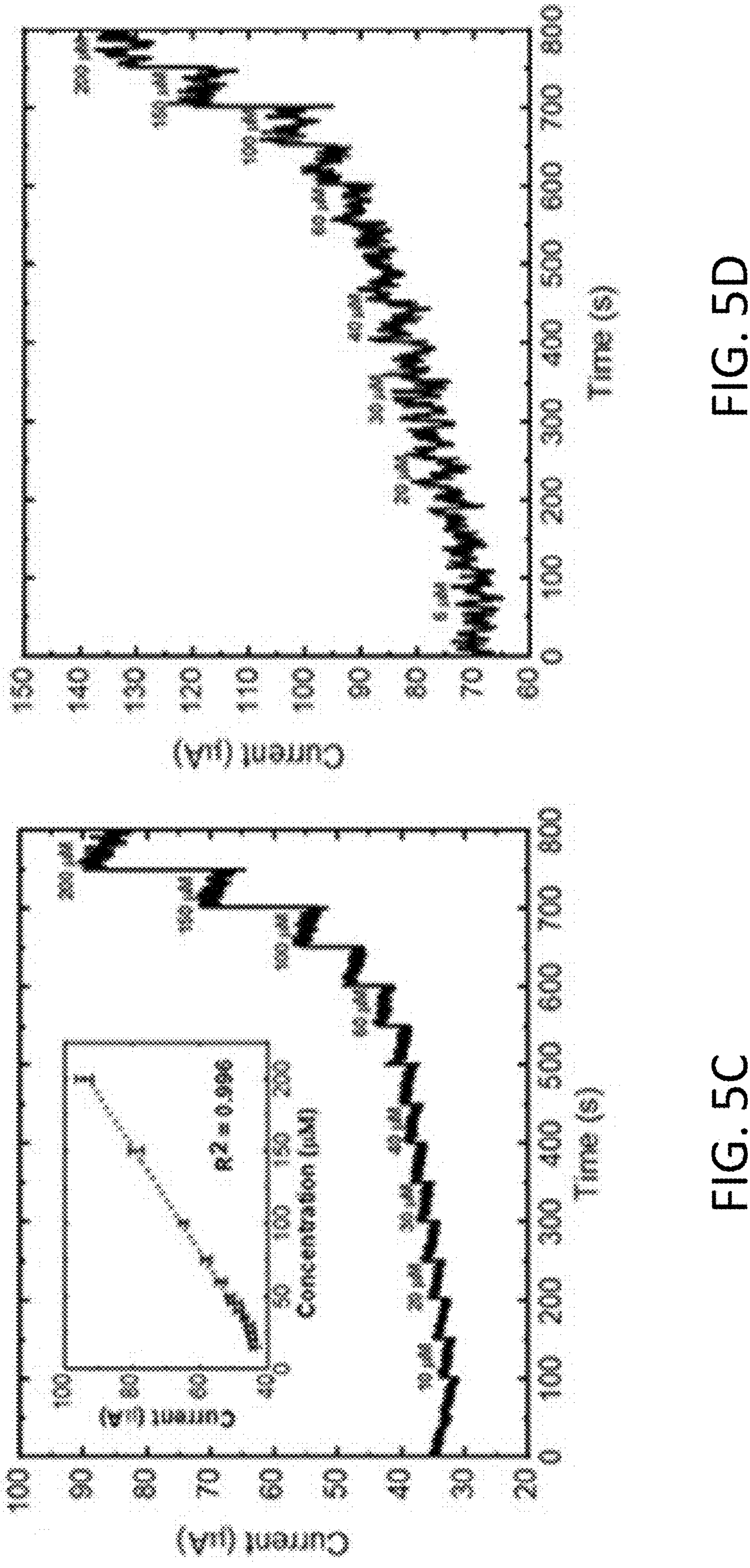

FIGS. 5A-5D depict chronoamperometric responses of PPy and PPy-Cu for the successive addition of dopamine in 0.1 M PBS (pH=6). FIG. 5A depicts PPy-Cu with an electrodeposition time of 60 s (PPy-Cu 60 s). FIG. 5B depicts PPy-Cu with an electrodeposition time of 120 s (PPy-Cu 120 s). FIG. 5C depicts PPy-Cu with an electrodeposition time of 180 s (PPy-Cu 180 s). FIG. 5D depicts PPy-Cu with an electrodeposition time of 300 s (PPy-Cu 300 s). Inset images show the calibration curve for peak intensity versus dopamine concentration. Error bars are calculated from the response registered from three different electrodes synthesized following the same procedure, and from triplicate measurements for each electrode which is a total of nine replicates. The amperometric response of the polypyrrole-copper (PPy-Cu) electrodes prepared as described herein showed a linear response to changes in concentration of dopamine as shown in FIGS. 5A-5D. The limit of quantification (LOQ) for detection of dopamine by the polypyrrole-copper (PPy-Cu) electrodes prepared as described herein are shown in Table 1 of Example 1. PPy-Cu 120 s demonstrated the lower LOD of 1.19 μM. The polypyrrole-copper electrodes prepared as described herein show a large linearity range of dopamine detection.

Figure 6:
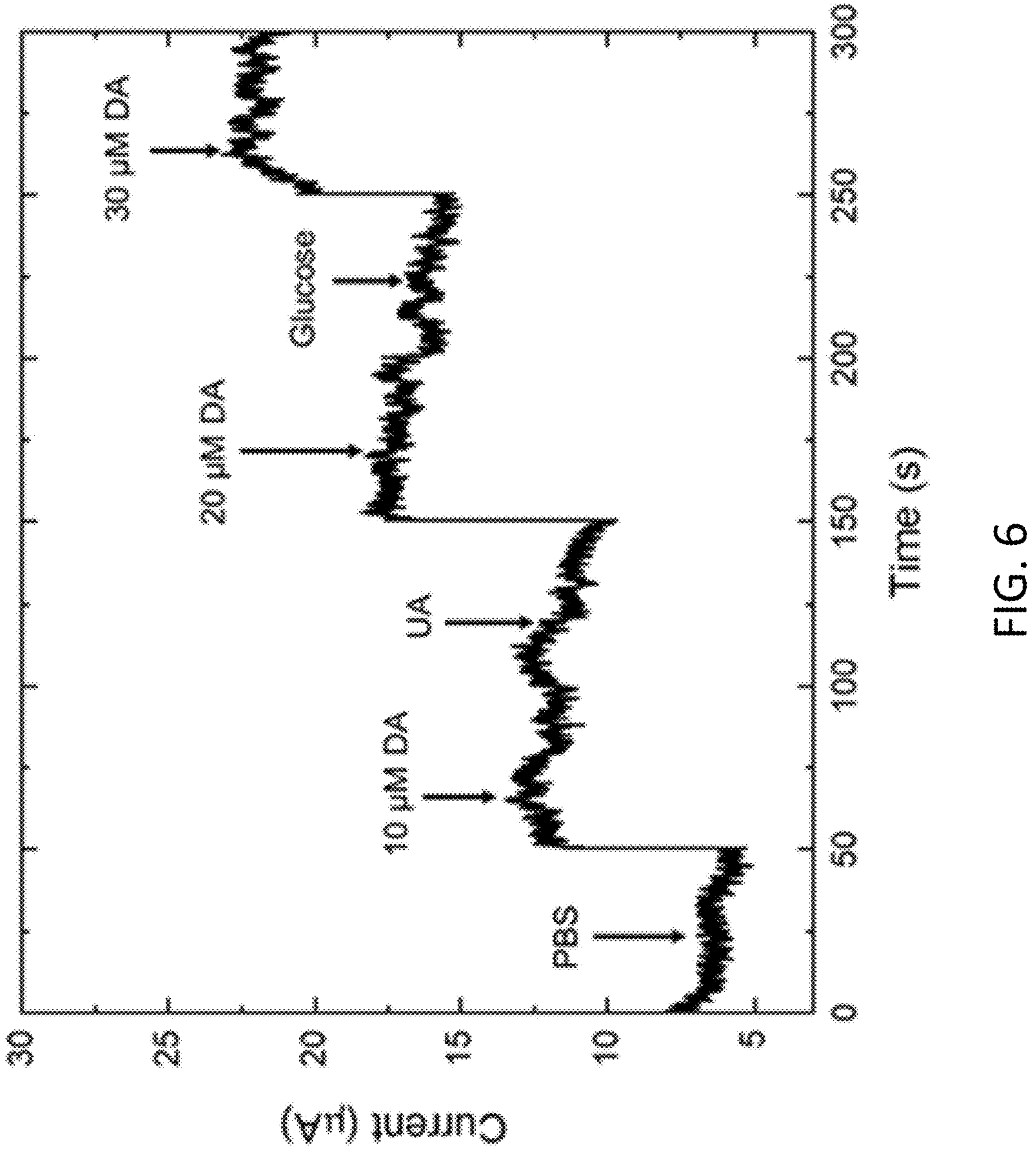
FIG. 6 depicts chronoamperometric responses of PPy-Cu 120 s flexible nanocomposite sensor for dopamine sensing in the presence of two interfering species: UA and glucose.

The polypyrrole-copper electrodes prepared as described herein are able to detect dopamine in the presence of other contaminants. FIG. 6 depicts chronoamperometric responses of a PPy-Cu 120 s flexible nanocomposite sensor for dopamine (DA) sensing in the presence of two interfering species: uric acid (UA) and glucose. FIG. 6 shows the selective determination of dopamine by PPy-Cu 120 s flexible nanocomposite at 0.3 V vs. Ag/AgCl in the presence of common interfering species glucose and UA.

Self-standing PPy-Cu flexible nanocomposites were synthesized following electropolymerization and modification through electrodeposition. The content and structure of copper nanoparticles was controlled by modifying electrodeposition conditions. The incorporation of copper nanoparticles enhanced the electroactivity of the as-prepared flexible sensor and enabled sensing of dopamine. The surface morphology of the nanocomposite demonstrated the presence of small nuclei, clusters, and fern-like nanoregions depending on electrodeposition time that defines crystal growth. Copper was well dispersed and homogeneously distributed on the nanocomposite surface. The XPS characterization showed the presence of copper oxides at the nanoparticles interface. Polypyrrole was agnostic to the presence of dopamine analyte in solution. The modified PPy-Cu electrodes showed sensitivity towards increasing concentrations of analyte. The differential pulse voltammetry (DPV) analysis illustrated a peak of oxidation of dopamine at 0.3 V vs. SHE that was selected as working potential for dopamine quantification. The DPV showed PPy-Cu 120 s as the composite sensor with higher peak intensity, which was correlated with its higher sensitivity. A comparison between the different sensors synthesized demonstrated PPy-Cu 120 s as the sensor with lower LOD and wider linear range. Smaller contents of copper resulted in loss of sensitivity modifying the LOD from 1.19 for PPy-Cu 120 s up to 2.42 for PPy-Cu 60 s. Further increases in copper content (e.g., fern-like structures) resulted in a loss of detection capabilities increasing the LOD by 12-fold up to 14.31 for PPy-Cu 180 s. PPy-Cu 120 s was further assessed by conducting analyses in presence of common interferents of dopamine that are present in blood samples and in vivo conditions such as glucose and UA. Addition of interferents did not impact the quantification capabilities of the sensor.

Dopamine (DA) is a neurotransmitter that is involved in a variety of functions throughout the body of a human being. An imbalance in dopamine levels has been linked to a variety of neurological conditions such as Parkinson's disease. In the present example, dopamine serves as a sample analyte for electrochemical sensing by a hybrid nanocomposite of self-supported polypyrrole electrodes modified with copper nanoparticles (PPy-Cu).

Materials and Chemicals. Pyrrole, used as a monomer precursor for electropolymerization, and copper sulfate, used as a precursor for copper nanoparticle deposition, were supplied by Sigma-Millipore (>99% purity). Analytical grade sodium dodecylbenzene sulfonate, used as a surfactant, was provided by Sigma-Millipore. HPLC grade acetonitrile was used as a solvent and sodium perchlorate was used as an electrolyte. HPLC grade acetonitrile and sodium perchlorate were purchased from Sigma-Millipore. Phosphate buffers were prepared with analytical grade sodium phosphate monobasic monohydrate ($NaH_2PO_4 \cdot H_2O$) and sodium phosphate dibasic heptahydrate ($Na_2HPO_4 \cdot 7H_2O$) supplied by Sigma-Aldrich. Dopamine hydrochloride was used as analyte. The interferents uric acid and glucose were of analytical grade and were used as received from Sigma-Aldrich. Sulfuric acid and sodium hydroxide were used to adjust the pH of solutions. Titanium sheet, Grade 4, supplied by McMaster Carr, was used as the substrate to electropolymerize pyrrole. Aqueous solutions were prepared using ultrapure water (Millipore Milli-Q system with resistivity >18 MΩ cm at 25° C.).

Self-standing polypyrrole electrode preparation. Self-standing polypyrrole flexible electrodes were synthesized using the electropolymerization of pyrrole in an organic phase system. A three-electrode system was used with titanium plates as the working and counter electrodes and Ag/AgCl as the reference electrode to control the electrochemical polymerization process. The electrolyte bath was composed of 0.2 M pyrrole monomer, 2.5 mM sodium dodecylbenzenesulfonate as surfactant, and 0.1 M sodium perchlorate as a supporting electrolyte in a 2:98 water: acetonitrile solution. Pyrrole was polymerized on a titanium plate for 2 hours at a constant current density of 2 $mA/cm^2$ to obtain the appropriate thickness (about 70 μm) for polypyrrole to function as a self-standing electrode. After polymerization, the polypyrrole electrode was rinsed with acetonitrile to remove excess monomer, rinsed with milli-Q water, and dried in an ambient atmosphere for 60 mins. The self-standing polypyrrole electrode was then cut from the titanium plate using a knife blade and was utilized as the flexible support to electrodeposit copper nanoparticles to develop hybrid self-standing polypyrrole-copper flexible nanocomposite electrodes. The titanium that acted as substrate to enable polypyrrole electropolymerization is not part of the sensor since polypyrrole was cut out from the metallic substrate. The procedure of cutting polypyrrole from the metallic substrate provides uniform polypyrrole layers that as a self-standing material become a flexible and adaptable electrode.

Synthesis of flexible PPy-Cu nanocomposites. The fabrication of hybrid polypyrrole-copper flexible nanocomposites was carried out through copper electrodeposition under potentiostatic conditions using a potentiostat (PGSTAT302N, Metrohm, USA). A three-electrode system was set-up with as-prepared self-standing polypyrrole electrodes as the working electrode, platinum wire as the auxiliary electrode and Ag/AgCl as the reference electrode. The electrodeposition bath consisted of a solution of 10 mM ($CuSO_4$) in 0.1 M $H_2SO_4$. Electrodeposition was conducted at a constant cathodic potential of −0.3 V vs. Ag/AgCl (3 mol $L^{-1}$ KCl) sustained for different times of 60 s, 120 s, 180 s, and 300 s. The different nanocomposite electrodes were classified as PPy-Cu 60 s, PPy-Cu 120 s, PPy-Cu 180 s, and PPy-Cu 300 s, respectively, based on their electrodeposition time. The electrodeposition potential is not in the region of PPy reduction which occurs at more negative potentials than-0.4 V vs. Ag/AgCl. Copper can be electrodeposited on reduced PPy electrodes where conductivity is lost due to the polymer reduced state. The electrosynthesized PPy-Cu nanocomposite electrodes were rinsed with ultrapure water and dried at room temperature before being used as the self-standing electrochemical sensor (FIG. 1).

Electrode characterization. The morphological difference of PPy and PPy-Cu nanocomposites was characterized by scanning electron microscopy (SEM) using a Zeiss Auriga FIB-SEM instrument at 5 kV. Energy-dispersive X-ray spectroscopy (EDS) was performed using Zeiss-Auriga for elemental mapping at 20 kV. The XPS analysis was conducted on the polypyrrole electrodes to determine the oxidation states of Cu present in the PPy-Cu nanocomposite, using the Kratos Axis Supra +. Electrochemical response of the synthesized electrodes was evaluated by DPV using a three-electrode set up where the conductive polymers were used as working electrode, platinum wire as counter electrode, and Ag/AgCl as reference electrode. For the DPV analysis, a scan rate of 4 mV/s, amplitude of 50 mV, pulse width of 50 ms, and a pulse period of 200 ms were used as the scan parameters.

Electrochemical sensing. The electroanalytical quantification of dopamine was conducted using a Metrohm Autolab PGSTAT302N potentiostat/galvanostat system controlled by Autolab Nova 2.1 software. DPV was conducted in absence and presence of dopamine to identify the potential of the dopamine oxidation that corresponds to the maximum intensity using the same scan parameters described above. Electroanalytical experiments were conducted by chronoamperometry (I-t tests) at the defined potential by DPV analyses. A three-electrode system with a single compartment cell was used with as-prepared self-standing PPy and PPy-Cu electrodes, as the working electrode, Ag/AgCl as the reference electrode and Pt wire as the auxiliary electrode. The active surface area of the electrodes was kept constant at 1.5 $cm^2$. The electroanalytical tests were conducted at atmospheric temperature in an electrolyte solution of 0.1 M PBS (pH=6) under stirring at different dopamine concentrations. Error bars are calculated from the response registered from three different electrodes synthesized independently from scratch by following the same procedure and from triplicate measurements for each electrode, which corresponds to a total of nine replicates for each point.

Structural characterization of polypyrrole flexible electrodes. Surface morphology of synthesized polypyrrole and composite PPy-Cu electrodes was characterized by SEM. The SEM image showed a characteristic packed globular morphology of electropolymerized polypyrrole. Copper electrodeposition generates small metallic nuclei that grow with electrodeposition time. The SEM images of PPy-Cu 60 s, PPy-Cu 120 s, PPy-Cu 180 s, and PPy-Cu 300 s show that at higher electrodeposition time, the crystal growth of copper nanoparticles is facilitated, leading to the formation of larger clusters. The EDS mapping illustrates how smaller deposition times (e.g., PPy-Cu 60 s) generate a distribution of copper sites over the polymeric substrate. Increasing deposition time increases growth of copper nuclei, forming cylinder-like copper deposits. Higher electrodeposition times (e.g., PPy-Cu 300 s) demonstrates dendritic growth with fern-like structure. The formation of larger agglomerates may decrease the surface area of copper available as catalytic sites for analyte detection. Optimization of electrodeposition times plays a role in increasing the sensitivity of flexible nanocomposite electrodes.

The EDS spectra show that the polymer included C, O, and N, which forms the backbone of polypyrrole. A small amount of Cl was also observed which may arise from traces of electrolyte that were not washed out and remained embedded within the polymer structure. The nanocomposites of PPy-Cu show peaks associated with copper presence. Copper signals increase with the electrodeposition time, correlating with the morphologies observed in the SEM images. The peaks associated with copper presence and the morphologies observed in the SEM images demonstrate modification of polypyrrole substrates to provide nanocomposite structures.

XPS was used to investigate the oxidation state of Cu in PPy-Cu flexible nanocomposites. FIGS. 2A-2F show XPS spectra of polypyrrole (PPy) and PPy-Cu. FIG. 2A shows XPS spectra of PPy. FIG. 2B shows XPS spectra of PPy-Cu. FIG. 2C shows XPS spectra of PPy-Cu with an electrodeposition time of 60 s. FIG. 2D shows XPS spectra of PPy-Cu with an electrodeposition time of 120 s. FIG. 2E shows XPS spectra of PPy-Cu with an electrodeposition time of 180 s. FIG. 2F shows XPS spectra of PPy-Cu with an electrodeposition time of 300 s. In FIGS. 2C-2F, Cu(II) 202 is shown as dotted lines and Cu(0) 204 is shown as solid lines. As shown in FIG. 2A, the spectrum of polypyrrole reveals the presence of characteristic C1s, O1s and N1s peaks in the polypyrrole matrix. FIG. 2B shows that an additional peak associated to Cu2p is visible. The Cu2p peak intensity increases with higher copper content. Deconvolution of Cu2p peaks in PPy-Cu XPS spectra presents signals at 932.6 eV and 953 eV, which may be attributed to either Cu(0)/Cu (I). The peaks observed at 935 eV and 955 eV were associated to the presence of Cu(II). A peak observed at 942 eV is the satellite peak which is associated to the presence of Cu(II) in the electrode material. Due at least in part to the peak area it can be inferred that the Cu(II) peak increases at increasing electrodeposition times, indicating that a higher amount of Cu(II) is present in samples when submitted to higher electrodeposition time. The copper interfaces can be copper oxides.

Polypyrrole flexible electrodes as dopamine sensors. DPV was used to identify the peak of oxidation of dopamine on the as-prepared polypyrrole and polypyrrole-copper nanocomposites. FIG. 3 shows the normalized current response registered during DPV analyses for as-prepared electrodes in the presence and absence of 50 μM dopamine in 0.1 M PBS (pH=6). Polypyrrole electrodes do not depict any increase in current response in presence of dopamine which demonstrates polypyrrole is not sensitive to the analyte. The nanocomposites that incorporate copper domains present a peak of dopamine oxidation at 0.3 V vs. Ag/AgCl. Evaluation of the dopamine oxidation signal in FIG. 4 indicates that the PPy-Cu 120 s has a higher peak intensity than the other synthesized PPy-Cu electrodes. In one example, an excess of copper domains may be detrimental for the electrode sensitivity.

To determine the stability of the polypyrrole-copper electrode at a range of potential oxidation, a comparative DPV analysis of PPy in PBS, PPy-Cu 120 s in PBS, and PPy-Cu 120 s in PBS with DA within a range of potential from 0.1 V vs. Ag/AgCl up to 1.0 V vs. Ag/AgCl. As shown in FIG. 4, the characteristic oxidation peak of polypyrrole is observed at 0.8 V vs. Ag/AgCl with an onset potential of about 0.6 V vs. Ag/AgCl for the electrodes. Analysis conducted potentiostatically at potentials below this value should not result in the undesired oxidation and degradation of PPy. The oxidation of copper domains shows an oxidation peak at 0.4 V vs. Ag/AgCl. The characteristic peak of dopamine oxidation is observed at 0.27 V vs. Ag/AgCl which represents a difference >100 mV with respect to the other oxidation peaks (e.g., Cu and PPy). A shoulder related to copper oxidation is observed at 0.4 V vs. Ag/AgCl for the DPV scan in presence of DA analyte. When DA analysis is conducted potentiostatically at ≤0.3 V vs. Ag/AgCl the current registered is related to the analyte DA oxidation.

To evaluate the sensing performance of self-standing polypyrrole-copper nanocomposite electrochemical sensors towards dopamine, chronoamperometric measurements (I-t tests) at the peak potential of 0.3 V vs. Ag/AgCl were conducted for increasing concentrations of dopamine. FIGS. 5A-5D show the amperometric response registered for increasing concentrations of dopamine in intervals of 50 s for PPy-Cu 60 s, PPy-Cu 120 s, PPy-Cu 180 s, and PPy-Cu 300 s, respectively. For successive increase in dopamine concentration, an intensity increase response is observed for self-standing electrodes. The modification of polypyrrole with copper nanoparticles grown electrochemically has an impact on the substrate conductivity. There is an increase on the initial current registered in PBS solution that ranges from −32 μA for PPy-Cu 60 s up to 68 μA for PPy-Cu 300 s. The PPy-Cu 300 s shows a high signal-to-noise ratio that can be due at least in part to the copper agglomeration across the polymer matrix. Similar current can be observed for different dopamine concentrations. Electrodeposition time was demonstrated to be detrimental to the sensitivity of the self-standing nanocomposite sensors.

The inset of FIGS. 5A-5D shows the linear correlation between the current response and dopamine concentration. The different polypyrrole-copper nanocomposites were compared for their sensing capability towards dopamine using the linearity range, the coefficient of determination ($R^2$ value), limit of detection (LOD) (S/N=3), and limit of quantification (LOQ). Data are collected in Table 1. PPy-Cu 120 s is the self-standing flexible sensor synthesized with the lowest LOD of 1.19 μM. The PPy-Cu 60 s sensors presented a 2-fold higher LOD of 2.42 μM. Despite the larger dispersion of copper nuclei, the smaller content diminishes the sensitivity of the sensor. Growth of electrodeposited copper decreases the sensitivity by increasing the LOD 12-fold up to 14.31 μM for PPy-Cu 180 s. A LOD of 14.31 correlates with the observed decrease in peak current observed in FIG. 3. A LOD of 14.31 demonstrates the loss of sensing competitiveness if an increased amount of copper content is present at the sensor interface.

TABLE 1

Comparison of as-prepared electrodes towards the determination of dopamine

| Sensor | Linear range (μM) | $R^2$ | LOD (μM) | LOQ (μM) |
|---|---|---|---|---|
| PPy | — | — | — | — |
| PPy-Cu 60 s | 5-190 | 0.997 | 2.42 | 8.08 |
| PPy-Cu 120 s | 2.5-250 | 0.999 | 1.19 | 3.98 |
| PPy-Cu 180 s | 15-200 | 0.996 | 14.31 | 47.70 |
| PPy-Cu 300 s | —* | —* | —* | —* |

*The high noise to signal ratio renders the sensor not competitive for fast and reliable quantification of analyte dopamine.

The range of linearity defines the range of concentrations that can be effectively quantified by the sensor. The PPy-Cu 120 s presents a range of concentrations from 2.5 μM to 250 μM dopamine. The LOD is 1.19 with a coefficient of determination ($R^2$) value of 0.999.

Selectivity of PPy-Cu flexible sensors. Selectivity of the sensor towards the target analyte was determined in the presence of interfering species. Interferents that may be present in samples containing dopamine are glucose and uric acid (UA). Both species can co-exist with dopamine in human blood plasma and may be oxidized in the same potential range as dopamine. FIG. 6 illustrates the selective determination of dopamine by PPy-Cu 120 s flexible nanocomposite at 0.3 V vs. Ag/AgCl in the presence of the interfering species glucose and uric acid. With the initial addition of 10 μM dopamine in 0.1M PBS (pH=6), the current response increases, and a current of 12 μA is registered, which corresponds to the current registered in FIG. 5B for 10 μM DA with PPy-Cu 120 s. When the same concentration of UA was added in the solution, there was no observable change in the current response. Further increasing the concentration of dopamine from 10 μM to 20 μM after the addition of UA, the current increases to 17 μA, which is the current registered for 20 μM of DA without the presence of any interferents as shown in FIG. 5B. There was no noticeable change in the current response upon the addition of glucose to the same solution. Increasing the concentration of DA from 20 M to 30 μM increases the current response to 22 μA, which is the same current recorded for 30 μM DA in the absence of interferents. A selective PPy-Cu nanocomposite flexible sensor was developed which is capable of selectively quantifying dopamine in the presence of UA and glucose.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of fabricating an electrode, the method comprising:

electropolymerizing a polypyrrole matrix onto a metal substrate;

separating the polypyrrole matrix from the metal substrate; and electrodepositing metal nanoparticles onto the polypyrrole matrix to yield the electrode.

2. The method of claim 1, wherein electropolymerizing the polypyrrole matrix comprises:

contacting the metal substrate with an electrolyte bath comprising pyrrole monomers;

providing an electrical current to the metal substrate; and polymerizing the pyrrole monomers on the metal substrate.

3. The method of claim 2, wherein the electrolyte bath further comprises a surfactant, an electrolyte, and an organic solvent.

4. The method of claim 1, further comprising rinsing and drying the polypyrrole matrix before separating the polypyrrole matrix from the metal substrate.

5. The method of claim 1, wherein electrodepositing the metal nanoparticles onto the polypyrrole matrix comprises contacting the polypyrrole matrix with an electrodeposition bath comprising metal ions in an acidic solution.

6. The method of claim 1, wherein the electrodepositing occurs at a constant cathodic potential.

7. The method of claim 1, wherein the electrodepositing occurs for a length of time between 60 seconds and 300 seconds.

* * * * *